Patented Feb. 1, 1949

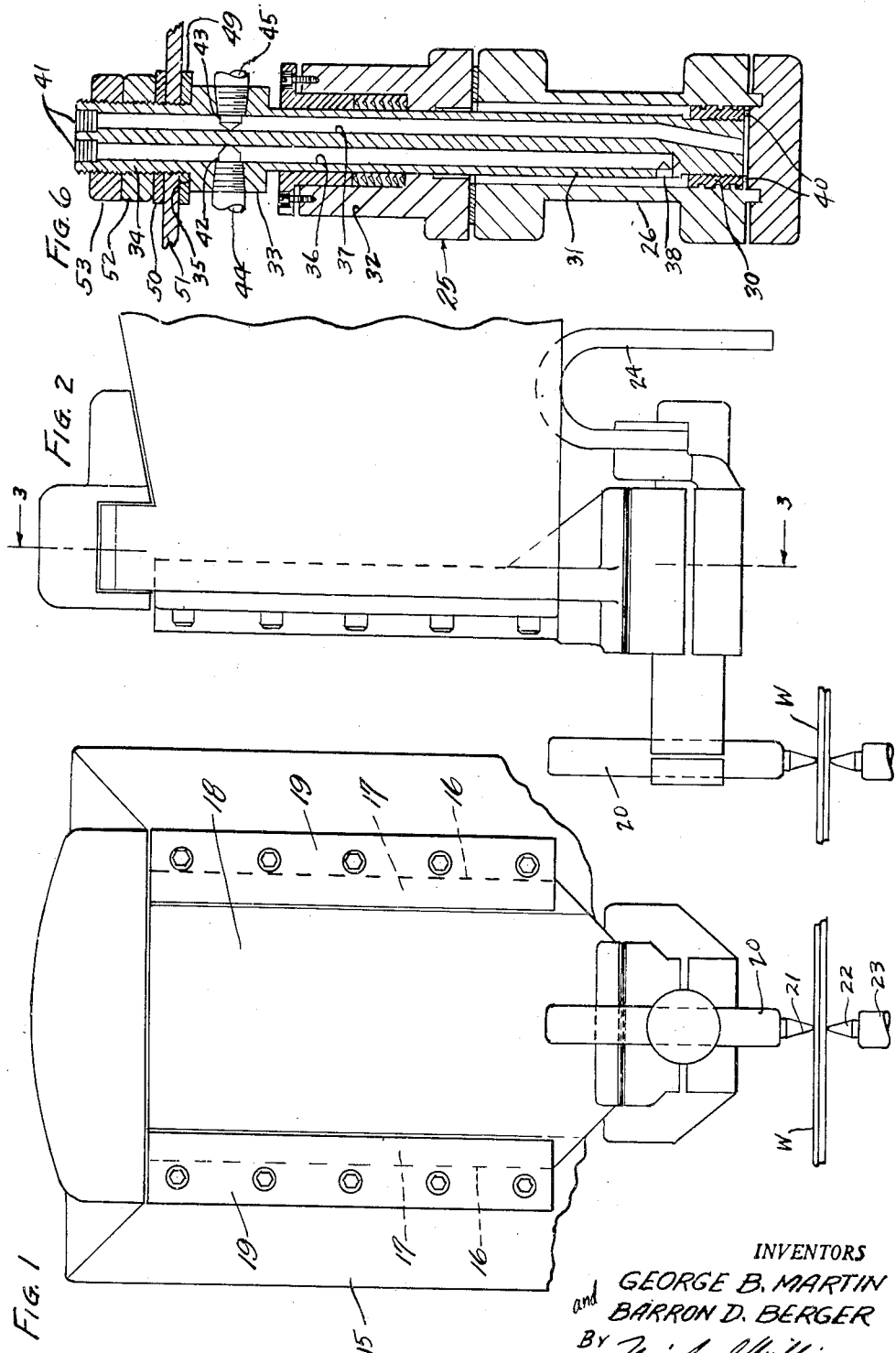

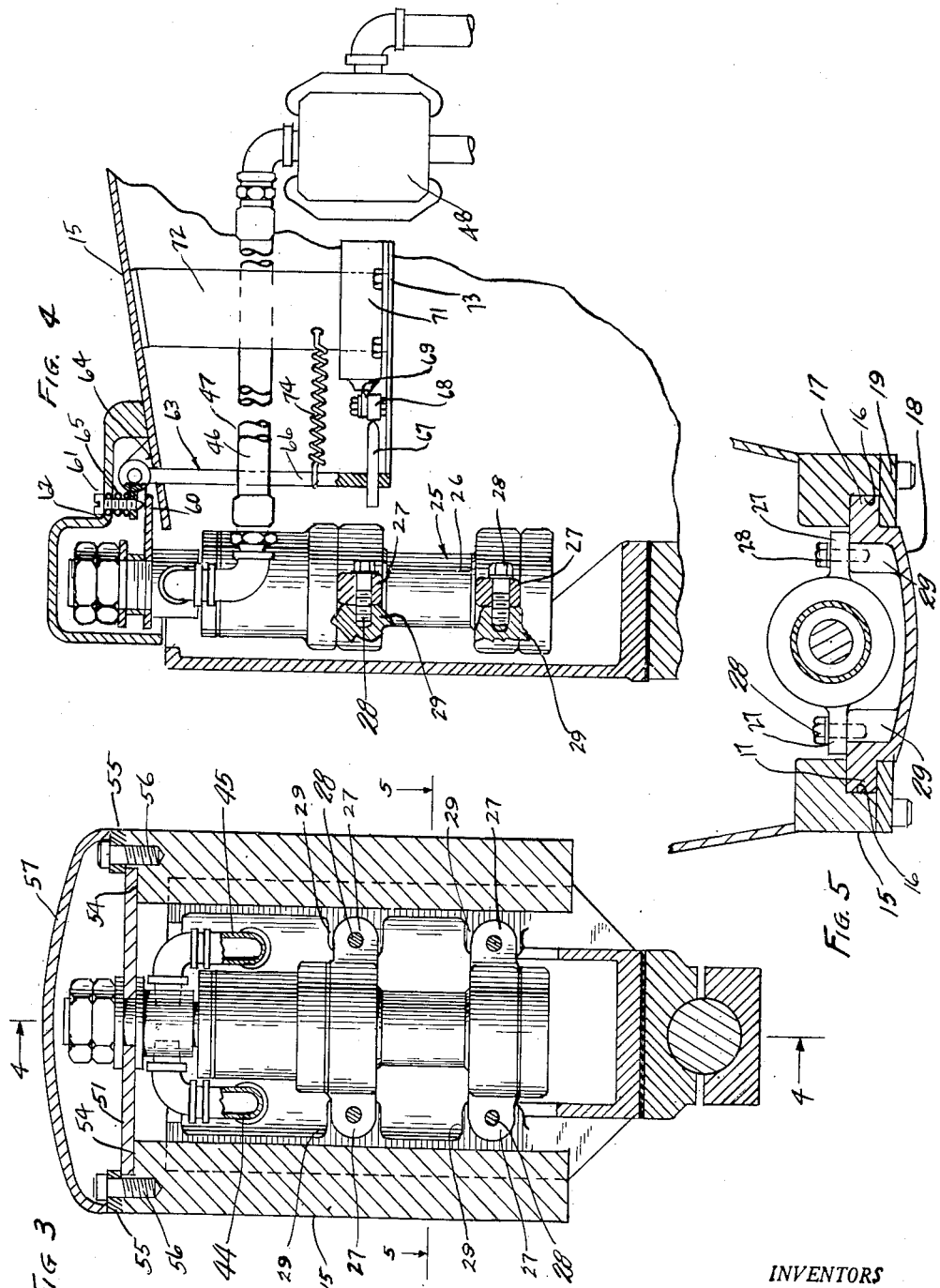

2,460,759

UNITED STATES PATENT OFFICE 2,460,759

ELECTRIC RESISTANCE WELDER

George B. Martin, Detroit, Mich., and Barron D. Berger, Warren, Ohio, assignors to The Federal Machine and Welder Company, Warren, Ohio, a corporation of Ohio Application August 20, 1946, Serial No. 691,844

10 Claims. (Cl. 219—4)

This invention relates to electrical resistance welders, and the principal object of this invention is to provide new and improved apparatus of this type.

To effect consistently good electric resistance welds, one of the factors to be controlled is that of establishing proper welding pressure prior to and at the time of passage of electrical current through the parts to be welded. High speed production makes the further demand that this correlation of pressure with firing shall be rapid, yet accurate and capable of withstanding long use without maintenance.

In the drawings accompanying this specification, and forming part of this application, there is shown, for purposes of illustration, an embodiment which the invention may assume, and in these drawings:

Figure 1 is a fragmentary front elevational view of a welding machine incorporating an embodiment of the invention, Figure 2 is a fragmentary side elevational view of the machine shown in Figure 1, Figure 3 is a fragmentary vertical sectional view corresponding generally to the line 3—3 of Figure 2, Figure 4 is a fragmentary vertical sectional view corresponding generally to the line 4—4 of Figure 3, Figure 5 is a fragmentary horizontal sectional view corresponding generally to the line 5—5 of Figure 3, and Figure 6 is an enlarged vertical sectional view through a fluid cylinder used in the embodiment of the invention.

The invention, for purposes of illustration, is shown as applied to an electrical welding machine of the so-called press-type, and the embodiment herein shown comprises a support or frame 15 of any desired construction, having elongated slide bearing surfaces 16 adapted to receive elongated slide surfaces 17 formed on a slide or head 18. The surfaces 16 and 17 are held in proper bearing relation by gibs 19 which are bolted to the support 15. Thus, the slide or head 18 is held to reciprocable movement relative to the support 15.

The slide or head 18 is movable toward or away from a work surface W, and carries an electrode 20 (usually termed the upper electrode) which is provided with a welding point 21. The work W is interposed between the welding point 21 of the upper electrode and a welding point 22 of a lower electrode 23 which is usually held stationary by a lower arm or horn (not shown). The slide 18 is electrically connected to one side of the welding transformer secondary by means of a flexible lead 24, in the customary manner. The lower electrode is connected to the other side of the welding secondary, and since such electrical connections are well known in the art and form no part of this invention, they are not shown.

The invention embodies means for correlating pressure of the electrodes against the work with firing of the welder. Such means comprises relatively movable parts, one connected for movement with the slide 18 and the other bearing against a yieldable abutment, the abutment yielding a certain amount after a selected pressure is reached, and cooperating with control means to effect operation of the welding machine.

In the embodiment shown and preferred such means comprises a fluid motor 25, preferably of the hydraulic type, having a cylinder body 26 formed with spaced-apart pairs of laterally extending apertured lugs 27. Bolts 28 pass through the apertures in the lugs 27 and thread into bosses 29 formed on the head 18.

A piston 30 (see Figure 6) of usual construction is disposed for reciprocation within the body 26, and a piston rod 31 is connected to the piston 30 and extends outwardly of the body 26 and through and outwardly of a packing gland 32.

Exteriorly of the gland 32, the rod 31 is formed with an enlargement 33, and beyond the enlargement 33, the rod has a reduced threaded extremity 34, forming a shoulder 35 with the enlargement 33.

The piston rod 31 is formed with two longitudinal bores 36 and 37, both extending inwardly from the extremity 34, the bore 36 stopping short of the piston 30, and communicating with a transverse bore 38 leading into the cylinder body above the upper face of the piston 30. The bore 37 extends completely through the rod 31 to the lower face of the piston 30, the lower end of the bore 37 being angled toward concentricity with the rod 31. The piston 30 is formed with legs 40 to keep it from completely bottoming, so that fluid from the port 37 will not be blocked when the piston is in its bottoming position.

The bores 36, 37, at the extremity 34 are closed by screw-threaded plugs 41, which, as a matter of precaution, are preferably welded in place. The enlargement 33 of the rod 31 is provided with two transversely extending bores 42 and 43 respectively communicating with the longitudinal bores 36, 37.

Pipes 44 and 45 are respectively threaded into the transverse bores 42, 43, and through suitable fittings are respectively connected with flexible conduits 46, 47 which lead from a solenoid-actuated fluid control valve 48. This valve controls flow of fluid under pressure through the conduits 46, 47, and to the bores 36, 37 in well-known manner, so that the piston 30 may be raised or lowered at will.

Bearing against the shoulder 35 of the rod 31 is a washer 49 which clamps between it and a spaced washer 50 a leaf spring 51. A clamping nut 52 bears against the washer 50, and a lock nut 53 locks the assembly in position.

As best seen in Figure 3, the leaf spring 51 has its ends resting on ledges 54 formed on the support or frame 15, and these ends are clamped in position by plates and bolts 55, 56 in such manner that the spring 51 may be flexed in an upward direction. A cap 57 is secured to the support 15 in position to cover the spring structure.

The washer 49 has an ear 60 extending to position wherein it is engageable with the end of an adjusting screw 61. The screw 61 is threaded into one arm 62 of a bell crank lever 63 which is pivoted about a rod carried by a bracket 64 extending from an adjacent surface of the support 15. A coil spring 65 encircles the shank of the adjusting screw 61 and is compressed between the head of this screw and the leg 62 of the bell crank lever 63, for the purpose of holding the screw in adjusted position. As shown in Figure 4, the head of the adjusting screw 61 extends through an opening in the cap 57, so as to be exposed for ready adjustment.

The other leg 66 of the bell crank lever extends downwardly between the flexible conduits 46, 47, and at its lower end carries a pin 67 adapted to abut a roller 68 carried by a reciprocable actuator element 69 of an electrical switch 71.

The switch 71 is carried by a bracket 72 depending from an adjacent surface of the support 15, the bracket 72 having a base 73 extending forwardly to abut and limit movement of the leg 66 of the bell crank lever 63. In the embodiment shown, the switch 71 is of the type wherein with the actuator element 69 in its inner position, no current flows through the switch. A tension spring 74 extends between the leg 66 and bracket 72 to constantly urge the actuator 69 to its inner position. The forward extension of the base 73 abuts the leg 66 on its movement to the right (Figure 4) and relieves the switch 71 from jarring action which would otherwise be produced by oscillating movement of the leg 66.

From the foregoing, it will be appreciated that the cylinder body 26 moves with the slide or head 18 and the piston rod is relatively stationary, exerting thrust against the leaf spring 51.

Thus, when the valve 48 is in position to supply fluid under pressure to the longitudinal bore 37, the cylinder body 26 and slide or head 18 are moved downwardly toward the work W. Such movement will cause the welding point 21 to clamp the work W between it and the welding point 22, and opposition to movement of the slide or head 18 is encountered. Such opposition causes the rod 31 to push harder against the leaf spring 51, and the leaf spring will deflect upwardly.

The adjusting screw 61 may be so adjusted that a selected pressure between the electrodes and the work will cause upward deflection of the leaf spring to rock the bell crank lever 63 in the direction whereby the pin 67 is drawn away from the switch 71, against the action of the spring 74, so that the actuator 69 is urged outwardly of the switch by any suitable resilient means (usually a part of the switch) to an outer position wherein it closes the switch contacts and provides for operation of the welder. It is preferred that the switch 71 control firing of the welder, and usually the switch actuates the timing mechanism (not shown) which determines the starting and stopping of current flow between the welding points 21, 22.

It will be appreciated that the deflected spring provides a force that is available when the metal of the work softens under influence of the welding current to quickly cause the slide or head 18 to follow up the weld, as contrasted with the relatively slow follow up provided by the stationary cylinder and movable piston rod of the prior art types of welders.

From the foregoing disclosure, it will be apparent that this invention provides means whereby the start of the flow of welding current may be accurately correlated with pressure at the welding points, while at the same time providing a construction which will withstand rapid and continuous use over long periods without requiring care of adjustment.

From the foregoing, it will be appreciated by those skilled in the art that we have accomplished at least the principal object of our invention, and it also will be apparent to those skilled in the art that the embodiments herein described may be variously changed and modified, without departing from the spirit of the invention, and that the invention is capable of uses and has advantages not herein specifically described; hence it will be appreciated that the herein disclosed embodiments are illustrative only, and that our invention is not limited thereto.

We claim:

1. An electrical resistance welder, comprising: electrode carrying means, movable toward or away from a work surface; means for urging said electrode carrying means toward said work surface; leaf spring means, connected to said urging means, for receiving thrust from said urging means, said leaf spring means being adapted to deflect an amount proportionate to the thrust applied; and means, actuated by deflection of said leaf spring means for controlling welding operation.

2. An electrical resistance welder, comprising: electrode carrying means, movable toward or away from a work surface; a fluid motor, having a reciprocable piston and piston rod, for moving said electrode carrying means toward said work surface; leaf spring means, connected to said piston rod to receive thrust from said piston, said leaf spring means being adapted to deflect a measurable amount when certain thrust is applied; and means, actuated by deflection of said leaf spring means, for effecting control of said welder.

3. An electrical resistance welder, comprising: electrode carrying means, movable toward or away from a work surface; means for urging said electrode carrying means toward said work surface, comprising relatively movable parts, one of said parts being connected for movement with said electrode carrying means; and spring means, connected to another of said relatively movable parts, and adapted to provide a yieldable support for said other part.

4. An electrical resistance welder, comprising: electrode carrying means, movable toward or away from a work surface; resilient means; a motor, having parts relatively reciprocable along the line of movement of said electrode carrying means, for urging said electrode carrying means toward said work surface, one of said parts being connected to said electrode carrying means and the other of said parts being supported against said resilient means; said resilient means being adapted to receive thrust from said motor and having such deflection qualities that when predetermined opposition to relative movement of said parts is encountered, the thrust from said motor will cause said resilient means to deflect; and means, actuated by deflection of said resilient means, for controlling welding operation.

5. An electrical resistance welder, comprising: electrode carrying means, movable toward and away from a work surface; spring means, carried by a stationary part of said welder; a fluid motor, comprising a cylinder body fixed to said electrode carrying means for movement therewith, and a piston having its rod connected to said spring means, the construction being such that when certain opposition to movement is met by said electrode carrying means, a certain thrust is applied to said spring means to deflect said spring means a certain amount; and control means, operated by certain deflection of said spring means, for controlling operation of said welder.

6. An electrical resistance welder, comprising: support means; a slide, mounted for reciprocable movement with respect to said support means; a leaf spring, carried by said support means; a fluid motor, comprising a cylinder body fixed to said slide for movement therewith, and a piston having its rod connected to said leaf spring, the construction being such that when certain opposition to movement is met by said slide, a certain thrust is applied to said leaf spring to deflect it a certain amount; switch means, for controlling firing of said welder; connector means, transmitting deflection movement of said leaf spring to actuation movement of said switch means; and adjustment means, providing for actuation of said switch means upon selected deflection of said leaf spring.

7. An electrical resistance welder, comprising: electrode carrying means, movable toward and away from a work surface; motor means, for moving said electrode means toward said work surface; and resilient means opposing thrust of said motor means, and extending transversely of the line of thrust, said resilient means being deflected by certain thrust force; and means, actuated by deflection of said resilient means, for effecting control of said welder.

8. An electrical resistance welder, comprising: electrode carrying means, movable toward or away from a work surface; motor means, for moving said electrode carrying means toward said work surface; leaf spring means, extending transversely of the line of movement of said electrode carrying means, and having engagement with said motor means, said leaf spring means being adapted to receive thrust from said motor means and being adapted to bend upon application of thrust; and means, actuated by bending of said leaf spring means, for effecting control of said welder.

9. An electrical resistance welder, comprising: electrode carrying means, movable toward and away from a work surface; means for urging said electrode carrying means toward said work surface, comprising relatively movable parts, one of said parts bearing against said electrode carrying means; and resilient means providing a yieldable base against which the other of said relatively movable parts is adapted to bear, said resilient means deflecting when said other part bears against said base with certain force; and control means, actuated by deflection of said resilient means, for effecting control of said welder.

10. An electrical resistance welder, comprising: support means; a slide, mounted for reciprocable movement with respect to said support means; leaf spring means, carried by said support means in position transverse to the line of movement of said slide; a fluid motor, comprising relatively movable parts, one part being connected to said slide and the other part being adapted to bear against said leaf spring means, the construction being such that when certain opposition to movement is met by said slide, a certain thrust is applied to said leaf spring means to cause it to deflect; and control means, actuated by deflection of said leaf spring means, for effecting control of said welder.

GEORGE B. MARTIN.
BARRON D. BERGER.

REFERENCES CITED

The following references are of record in the file of this patent:

UNITED STATES PATENTS

| Number | Name | Date |
|---|---|---|
| 1,536,838 | Geisenhoner | May 5, 1925 |
| 1,810,225 | Pugh | June 16, 1931 |
| 1,869,188 | Eckman | July 26, 1932 |
| 1,976,552 | Friesen | Oct. 9, 1934 |
| 2,365,148 | Clark | Dec. 12, 1944 |